Sept. 25, 1962
J. T. McNANEY
3,056,031
ELECTRO-OPTICAL DEVICE AND CIRCUITRY
Filed Dec. 21, 1959
3 Sheets-Sheet 1
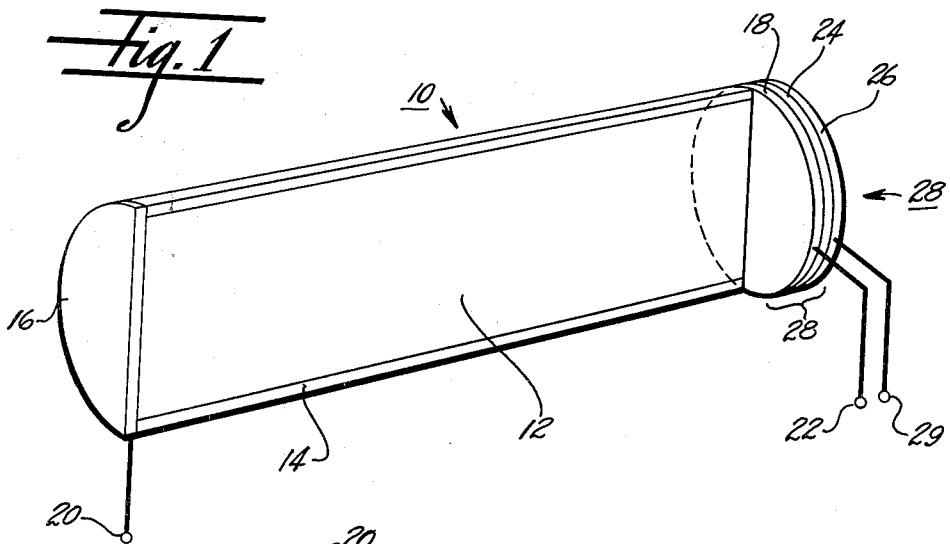
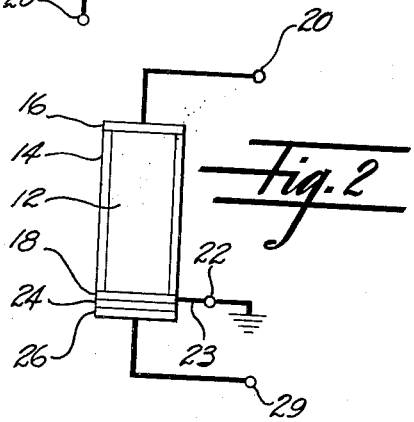
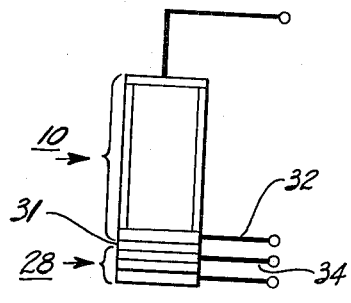
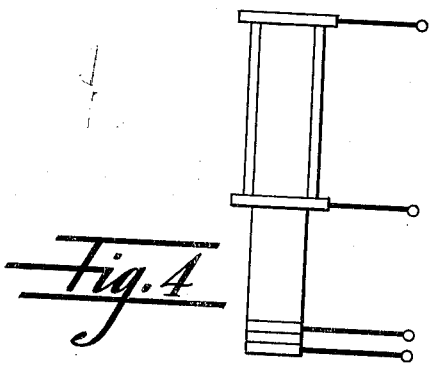
JOSEPH T. McNANEY
INVENTOR.
BY Sidney Magnes Sept. 25, 1962 J. T. McNANEY 3,056,031
ELECTRO-OPTICAL DEVICE AND CIRCUITRY
Filed Dec. 21, 1959
3 Sheets-Sheet 2

JOSEPH T. McNANEY
INVENTOR.

BY
Sidney Magnes

Sept. 25, 1962
J. T. McNANEY
3,056,031
ELECTRO-OPTICAL DEVICE AND CIRCUITRY
Filed Dec. 21, 1959
3 Sheets-Sheet 3
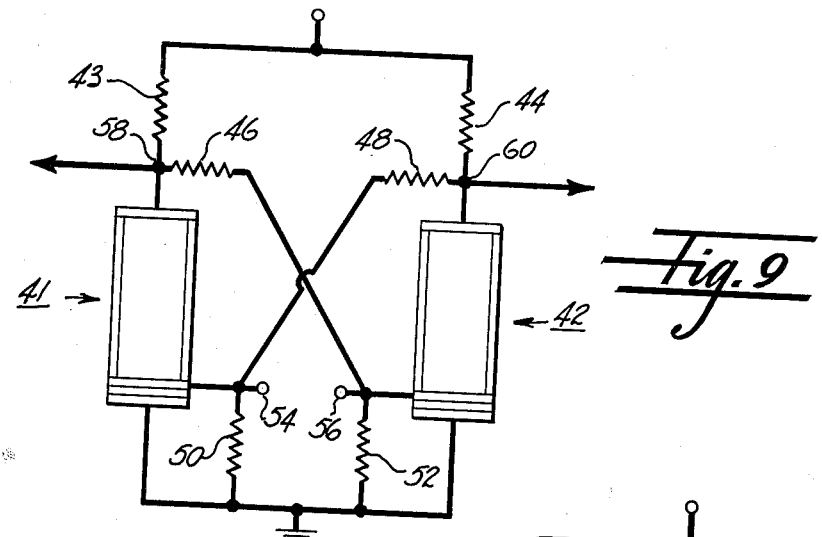
Fig. 9
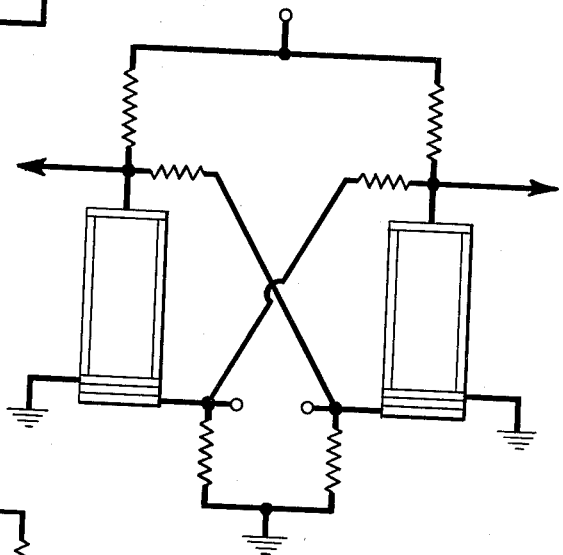
Fig. 10
Fig. 11
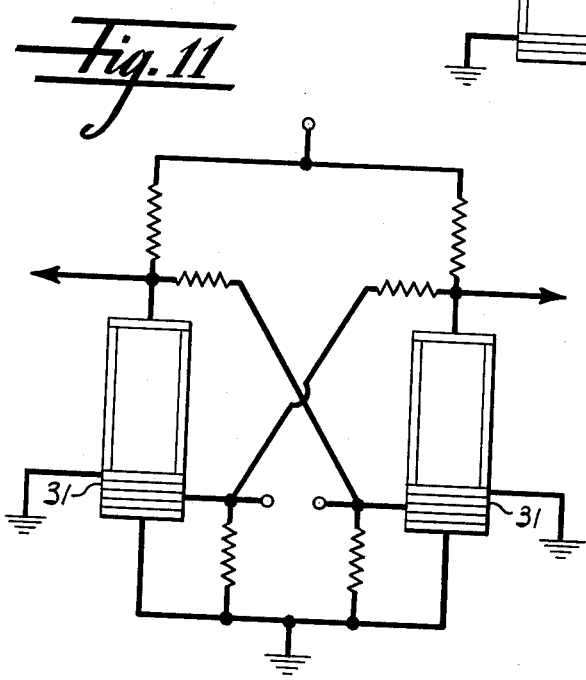
JOSEPH T. McNANEY
INVENTOR.
BY Sidney Magnes United States Patent Office 3,056,031
Patented Sept. 25, 1962

3,056,031
ELECTRO-OPTICAL DEVICE AND CIRCUITRY
Joseph T. McNaney, La Mesa, Calif., assignor to General Dynamics Corporation, Rochester, N.Y., a corporation of Delaware
Filed Dec. 21, 1959, Ser. No. 861,040
13 Claims. (Cl. 250—213)

This invention relates to an electro-optical device, and more particularly to one wherein light and/or electrical signals control an electrical circuit.

The basic elements of such an electro-optical device, often called a "lumistor," comprise a control element—usually an electroluminescent material that emits light under certain conditions, and a controlled circuit—usually a photoconductive material whose electrical resistance is reduced in the presence of light or other radiation. Prior-art lumistors, in an attempt to obtain "tight" coupling, i.e., causing the maximum amount of light from the electroluminescent material to impinge on the photoconductor, form the electroluminescent and photoconductive materials into sheets that are placed parallel and as close as possible to each other. This prior art structure, however, has a basic shortcoming, because the two sheets act like the plates of a capacitor. The inherent capacitance between the sheets (1) causes the associated circuitry to "see" a low impedance, and (2) limits the frequency response of the associated circuitry.

It is therefore the principal object of my invention to provide an improved electro-optical device.

The attainment of this object and others will be realized from the following specification taken in conjunction with the drawings of which:

FIGURE 1 is a cut-away drawing illustrating the basic concept of my invention;

FIGURE 2 illustrates my invention used as a switch or relay;

Figure 7:
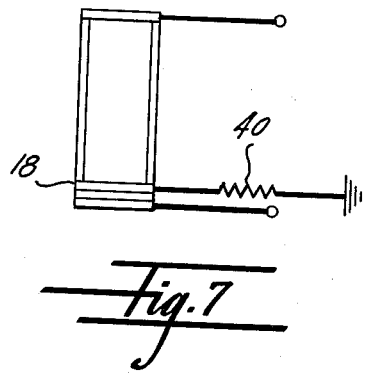
Figure 8:
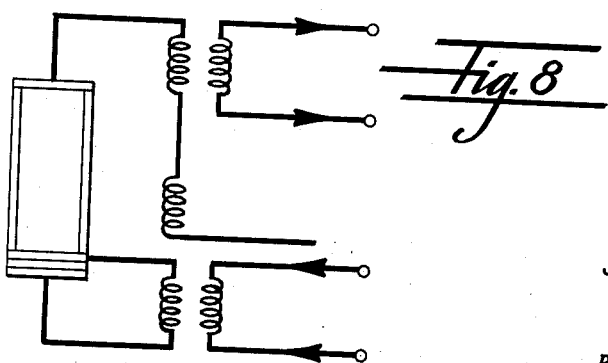

FIGURES 3, 4, 5, and 6 show various embodiments of my invention;

FIGURES 7 and 8 illustrate my invention used as an amplifier or as an oscillator;

FIGURES 9, 10, and 11 show my device used as a bistable multivibrator.

Broadly speaking, my invention contemplates a unitary structure, based on a light guide, that provides a tight coupling between a light producing means—associated with an input circuit, and a light responsive means—associated with an output circuit. Various embodiments either isolate these circuits or couple them to achieve different results.

The basic concept of my invention is shown in FIGURE 1. As previously indicated, a lumistor comprises a control element and a controlled element. My structure comprises an elongated rod-like light guide 12, which is a rod of good light-transmitting material such as quartz, glass, Lucite, etc. Rods of very small diameter are generally called "optical fibers," and have been made as small as .002" in diameter. Light guides operate by accepting light at one end thereof, transmitting it very efficiently through the material by internal reflections, and emitting it at the other end. The efficient transmission of light through a light guide depends upon several factors—one of them being the smoothness of the walls. Light guide 12 of FIGURE 1 acts in the conventional manner, except for a modification which will be hereinafter described.

FIGURE 1 shows that the longitudinal cylindrical surface of light guide 12 is enclosed in a contiguous sheath-like sleeve 14 of photoconductive material; i.e., one whose electrical resistance is high in darkness, but is reduced by impinging radiation.

In order that sleeve 14 may be part of an electrical circuit, it is necessary that connections be made to the ends thereof. Several types of connections are possible, FIGURE 1 showing conductive layers 16 and 18 on the transverse ends of the light guides. These layers are in electrical contact with the ends of the photoconductive sleeve, and therefore act as electrodes; other drawings show bands that serve as the electrodes. For reasons to be hereinafter discussed, in FIGURE 1 layer 18 is transparent, and may consist of tin oxide or the compound known as "Nesa." Electrodes 16 and 18 have terminals 20 and 22 connected thereto, so that photoconductive sleeve 14 is part of an electrical circuit.

When photoconductive sleeve 14 is in darkness, its high "dark" resistance does not permit any appreciable current to flow in response to a voltage impressed across terminals 20 and 22; whereas, when photoconductive sleeve 14 is illuminated, its lowered resistance permits a current to flow through the "output" circuit connected to terminals 20 and 22.

In order to control the resistance of the photoconductive sleeve, FIGURE 1 shows a film 24 of electroluminescent material positioned contiguously with transparent layer 18, and another layer 26 of conductive material positioned contiguously with the other surface of the electroluminescent film. Electroluminescent film 24 is thus sandwiched between two electrodes (18 and 26), the combination being known as an electroluminescent cell, or "electroluminor" 28.

The operation of my invention will be readily understood from FIGURE 2. This shows my structure in symbolic form, the various elements being designated by the same reference characters previously used. When a suitable energizing potential is applied to the electroluminor through terminals 22 and 29, electroluminescent film 24 is energized by the electrical field impressed across it, and it glows. The resultant light traverses transparent layer 18, enters the end of light guide 12, and—as has been described—is transmitted to the other end thereof by being repeatedly reflected from the inner surfaces. During the course of these reflections, some of the light escapes from light guide 12, and enters photoconductive sleeve 14; since light reduces the resistance thereof, the lowered resistance permits the flow of current through the external circuit connected to terminals 20 and 22.

To improve the operation of my invention, the cylindrical surfaces of light guide 12 are roughened, instead of being smooth as in the prior art. In addition, film 16 is made reflective, to provide many more light reflections. Due to the additional reflections and the roughened surface, light readily escapes to illuminate photoconductor 14.

It will be seen that, since my improved structure does not have the parallel plate structure of prior-art devices, it eliminates the prior-art shortcomings due to high inherent capacitance. My invention does, however, provide a very efficient coupling between the emitted light and the light that impinges upon photoconductive sleeve 14. My novel structure therefore produces the same end result as prior-art devices, but does so in an improved efficient way.

The lumistor shown in FIGURE 2 may be used as a control device having two different modes of operation. Firstly, when a potential is applied suddenly to electroluminor 28, the resistance of sleeve 14 is reduced abruptly; and the lumistor acts like a switch or a relay. If, on the other hand, the potential is applied to the electroluminor gradually, the resistance of sleeve 14 is varied slowly; and the lumistor then provides fine control. Since a great deal of power in the external circuit can be controlled by a relatively small voltage applied to the electroluminor, the device provides amplification.

In FIGURE 2 the input and/or the output can be either A.C. or D.C. Since the common terminal 22 is grounded, the currents of the input and output circuits traverse lead 23, but—due to its negligible resistance—do not affect each other. This arrangement thus provides relatively good isolation between the input and the output circuits.

Figure 5:
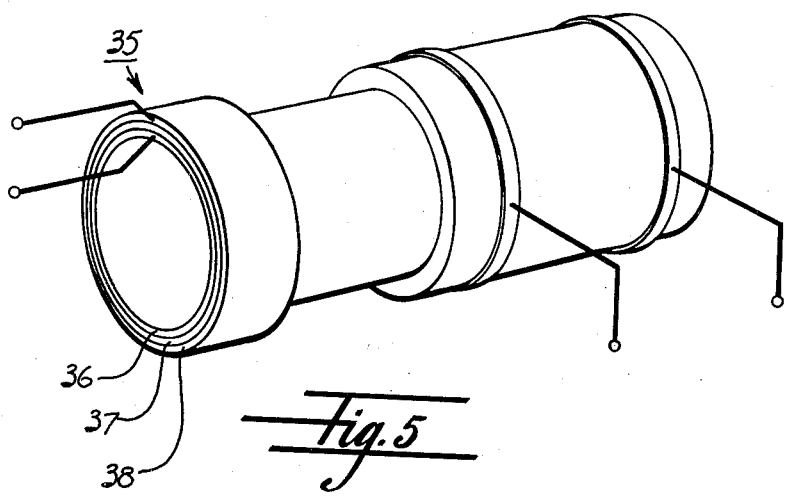

Under some conditions complete isolation of the input and output circuits is desirable, and FIGURES 3, 4, and 5 show various ways in which this may be done. In FIGURE 3 a transparent, but electrically insulating sheet 31 is positioned between the control element 28 and the controlled element 10. In this way light from the electroluminescent material affects the photoconductive sleeve, but the separated electrodes 32 and 34 isolate the input and output circuits from each other.

FIGURE 4 shows another arrangement wherein, the control and controlled elements are physically spaced apart, to produce complete isolation of the input and output circuits.

FIGURE 5 shows another embodiment, wherein the electroluminor 35 takes another form, comprising laminae that are concentric tubes. Here a first layer 36 of transparent conductive material sheathes one end of the light guide. It is surrounded by a coating 37 of electroluminescent material, which is in turn covered with a layer 38 of conductive material. The conductive layers act as electrodes, and electrical connections are made thereto. In this embodiment the electroluminescent material has a much larger light-emitting area.

Figure 6:
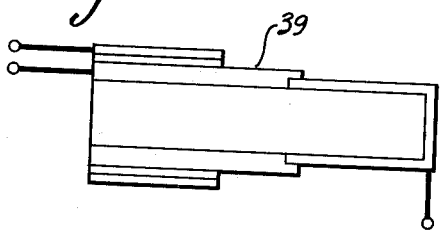

FIGURE 6 shows a modification wherein a single electrode 39 is common to both the photoconductive sleeve and the electroluminescent material.

FIGURE 7 shows an arrangement similar to that of FIGURE 2, except that a resistance 40 has been inserted into the common lead between electrode 18 and ground. In this case the currents from the input and output circuits both traverse resistance 40. The resultant voltage drops therefore produce "feedback" that affects the other circuit and—depending upon polarities, phase, potentials, etc.—the effect may be degenerative to produce stability—or regenerative to produce amplification. In fact, the regeneration can be so effective that the lumistor will have only two stable states; conductive and non-conductive.

FIGURE 8 shows a somewhat similar feedback circuit, the input and output being inductively coupled together. By proper choice of circuit parameters, the coupling can produce either amplification or sustained oscillations.

FIGURE 9 shows two lumistors 41 and 42 of the disclosed type interconnected to form a bistable multivibrator that can be triggered by light or electrical signals. The circuit is balanced; i.e., resistance 43 equals resistance 44; 46 equals 48; 50 equals 52; and lumistors 41 and 42 are identical, and in their high resistance state. It will be seen that the potentials at input terminals 54 and 56 are exactly the same, and so low that the electroluminors are not energized. A momentary input signal to lumistor 41 in the form of voltage or light causes it to assume its low resistance state. This produces two results. Firstly, the lowered resistance produces a higher potential at terminal 54, and thus across its electroluminor—which therefore continues to emit light after the exciting signal has been removed. Secondly, the low resistance state of lumistor 41 encourages more current to flow through resistance 43, which reduces the potential at point 58. This reduced potential is fed back to the input circuit of lumistor 42 at terminal 56, and assures that the electroluminor of lumistor 42 remain dark.

This is one of the bistable states of the circuit of FIGURE 9; namely, lumistor 41 in its low resistance state, and lumistor 42 in its high resistance state.

An input signal, either light or potential, is applied to lumistor 41, causing it to assume its low resistance state. This permits more current to flow through resistance 44, which lowers the potential at point 60 and—acting through feedback resistance 48—at terminal 54. When this happens, the electroluminor of lumistor 41 has a reduced voltage across it, and ceases to emit light. Lumistor 41 now assumes its high resistance state, and reduces the current flowing through resistance 43. The reduced current raises the potential at point 58 and at terminal 56. This action maintains lumistor 42 in its conductive state, causing lumistor 41 to assume its nonconductive state. Thus, the circuit has flipped to its second stable state, in the manner of a multivibrator. Output signals are obtained from any convenient portion of the circuit, such as points 58 and 60.

In the circuit of FIGURE 9, a portion of the output currents flowing through the photoconductive sleeves tends to flow through resistances 50 and 52. If this is objectionable, the circuit of FIGURE 10 or 11 may be used. In FIGURE 10, the common electrode is grounded with a low resistance lead, so that even though input and output currents both flow through this lead, there is no feedback.

In FIGURE 11, an additional transparent but insulative sheet 31 separates the input and output circuits, thus assuring isolation.

While the foregoing discussion has been conducted in terms of a cylindrical light guide and circumjacent sleeve, it is apparent that other cross sections can be used. In addition, the light guide need not be completely surrounded by the photoconductive material, although the area of the latter to a great extent determines the power-carrying-ability of the output circuit.

The particular embodiment of the invention illustrated and described herein is illustrative only, and the invention includes such other modifications and equivalents as may readily appear to those skilled in the art, within the scope of the appended claims.

I claim:

1. The combination comprising: an elongated rod-like light guide having a longitudinal surface; a film of photoconductive material positioned contiguously with said longitudinal surface at one end thereof—whereby light escaping from said longitudinal surface impinges on said photoconductive material and reduces the resistance thereof; a transparent conductive coating in contiguous relation with said longitudinal surface at the other end thereof; a film of electroluminescent material in contiguous relation with said transparent conductive coating; a coating of conductive material in contiguous relation with said film of electroluminescent material; and means for applying an energizing potential between said transparent conductive coating and said coating of said conductive material—whereby said electroluminescent material is energized to glow, and the light therefrom traverses said transparent conductive coating and said longitudinal surface to enter said light guide from where it escapes to impinge upon said photoconductive film and reduce the resistance thereof.

2. The combination of claim 1 further including a circuit to be controlled and means for controlling the flow of current in said circuit in response to the variations in resistance of said film of photoconductive material—whereby the resistance of said film controls the current flow through said circuit.

3. The combination of claim 1 wherein one of said conductive coatings is electrically connected to one end of said photoconductive material.

4. The combination of claim 1 wherein said conductive coatings are electrically isolated from said photoconductive material.

5. The combination comprising: an elongated light guide having a longitudinal surface and a transverse surface; a film of photoconductive material positioned in close proximity with said longitudinal surface of said light guide; means for connecting said film of photoconductive material to be part of an external electrical circuit— whereby the resistance of said film controls the current flow through said circuit; means for introducing light into said light guide through said transverse surface, said means comprising an electroluminescent cell; means for energizing said cell—whereby the resultant light escaping from said longitudinal surface of said guide impinges on said photoconductive material and reduces the resistance thereof, thereby controlling the current through said external circuit.

6. The combination of claim 5 wherein said electroluminescent cell energizing means and said external circuit are electrically isolated from each other.

7. The combination of claim 5 wherein said electroluminescent cell energizing means and said external circuit have a common lead.

8. The combination of claim 7 wherein said common lead is a low resistance connection.

9. The combination of claim 7 wherein said common lead is resistive.

10. The combination of claim 5 wherein said energizing means and said external circuit are coupled to provide feedback.

11. The combination of claim 10 wherein said coupling is inductive.

12. The combination comprising: a rod-like light guide having a roughened cylindrical surface and two transverse ends; a first layer of reflective, electrically conductive material positioned contiguously with one of said transverse ends; a first terminal connected to said first reflective layer; a second layer of transparent electrically conductive material positioned contiguously with said other transverse end; a second terminal connected to said transparent layer; a sheet of transparent electrically insulating material positioned contiguously with said second layer; a third layer of transparent conductive material positioned contiguously with said sheet; a third terminal connected to said third layer; a coating of electroluminescent material positioned contiguously with said third layer; a fourth layer of conductive material positioned contiguously with said electroluminescent coating; a fourth terminal connected to said fourth layer—whereby when an energizing potential is applied to said third and fourth terminals, said electroluminescent coating emits light that traverses said transparent layers and is transmitted along said guide to be reflected by said reflective layer, thus producing multiple reflections and encouraging said light to escape through said roughened cylindrical surface; a sleeve of photoconductive material positioned in contiguous circumjacent relation with said cylindrical surface, the ends of said sleeve being in electrical contact with said first and second terminals—whereby an external electrical circuit connected to said first and second terminals includes said photoconductive material, and light escaping from said cylindrical surface impinges on said photoconductive sleeve and reduces the electrical resistance thereof.

13. The combination comprising: a rod-like guide having a cylindrical surface and two transverse ends; a first layer of reflective, electrically conductive material positioned contiguously with one of said transverse ends; a first terminal connected to said first reflective layer; a second layer of transparent electrically conductive material positioned contiguously with said other transverse end; a second terminal connected to said transparent layer; a coating of electroluminescent material positioned contiguously with said second layer; a third layer of conductive material positioned contiguously with said electroluminescent coating; a third terminal connected to said third layer—whereby when an energizing potential is applied to said second and third terminals, said electroluminescent coating emits light that traverses said transparent layers and is transmitted along said guide to be reflected by said reflective layer, thus producing multiple reflections and encouraging said light to escape through said roughened longitudinal surface; a sleeve of photoconductive material positioned in contiguous circumjacent relation with said cylindrical surface, the ends of said sleeve being in electrical contact with said first and second terminals—whereby an external electrical circuit connected to said first and second terminals includes said photoconductive material, and light escaping from said cylindrical surface impinges on said photoconductive sleeve and reduces the electrical resistance thereof.

References Cited in the file of this patent

UNITED STATES PATENTS

| 2,506,672 | Kell et al. | May 9, 1950 |
| 2,583,132 | Altar et al. | Jan. 22, 1952 |
| 2,695,964 | Schepker | Nov. 30, 1954 |
| 2,914,679 | Loebner | Nov. 24, 1959 |

FOREIGN PATENTS

| 1,179,999 | France | May 29, 1959 |